J. O. ELLINGER.
REINFORCEMENT FOR CONCRETE CONSTRUCTION.
APPLICATION FILED OCT. 19, 1912.
1,094,845. Patented Apr. 28, 1914.
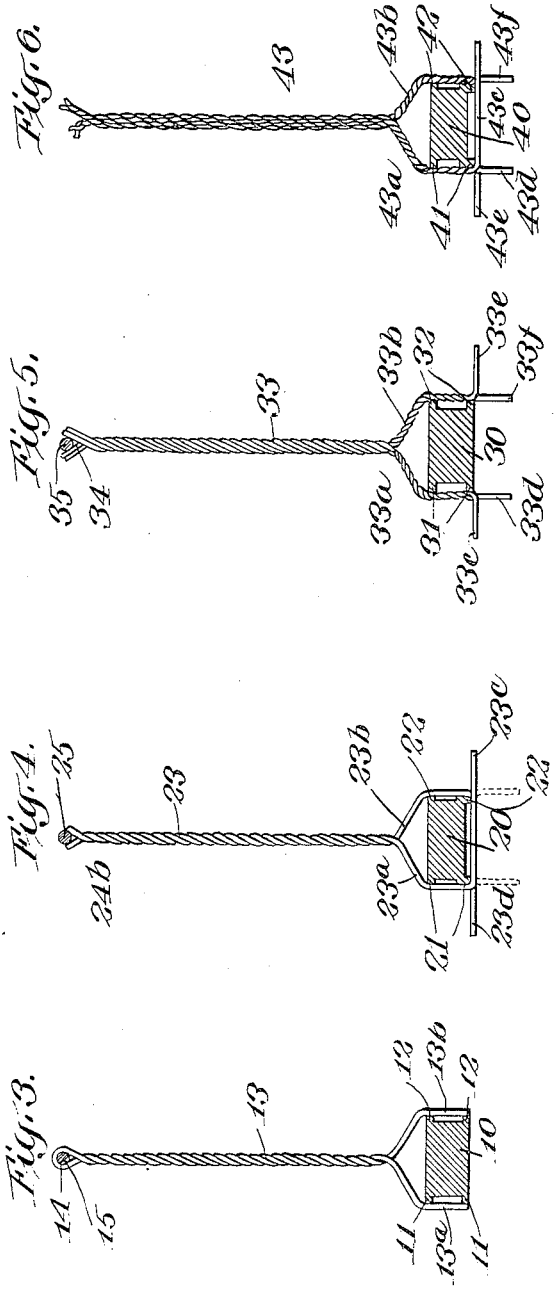
WITNESSES
INVENTOR
J. O. Ellinger
BY
ATTORNEY

UNITED STATES PATENT OFFICE.

JULIAN O. ELLINGER, OF NEW YORK, N. Y.

REINFORCEMENT FOR CONCRETE CONSTRUCTION.

1,094,845.

Specification of Letters Patent.   Patented Apr. 28, 1914.

Application filed October 19, 1912. Serial No. 726,600.

*To all whom it may concern:*

Be it known that I, JULIAN O. ELLINGER, a citizen of the United States, and a resident of the borough of Manhattan, city and State of New York, have invented certain new and useful Improvements in Reinforcement for Concrete Construction, of which the following is a specification.

This invention relates to improvements in concrete reinforcements of unit frame construction, wherein the tension member is formed of a longitudinal bar and the shear members formed of transverse members rigidly connected to the longitudinal bar, preferably by electric welding, and the shear members are of such material that they may be folded against the tension members for transportation.

The objects of the invention will appear from the hereinafter description taken in connection with the accompanying drawings, in which certain embodiments of the invention are illustrated.

Referring to the drawing: Figure 1 is a side elevation of one form of the unit frame showing the shear members in their raised position ready for use. Fig. 2 is a side view of the same showing the shear members folded against the longitudinal tension member for transportation or storage. Fig. 3 is a cross section on line 3 of Fig. 1. Fig. 4 is a cross section of a modification as to certain details. Fig. 5 is a cross sectional view of another modification. Fig. 6 is a cross sectional view of still another modification.

Referring to the drawing, and especially to Figs. 1, 2 and 3, the part marked 10 is a longitudinal bar forming the tension member. This bar is provided with welding projections 11 and 12. 13 is a series of tension members which are shown as a wire bent to form an eye 14, and twisted back upon itself with the free ends 13$^a$ and 13$^b$ spanning the longitudinal members and electrically welded thereto at the welding projections 11 and 12. Extending longitudinally through the eyes 14 and over each end of the longitudinal bar 10, is a rod 15. These rods may be rigidly connected to the twisted rods or shear members where they pass through the eyes, by electric welding or otherwise.

In the construction shown in Fig. 4, the shear members are marked 23, and their free ends 23$^a$ and 23$^b$, are of such length that they extend down one vertical side of the longitudinal bar which, in said figure, is marked 20, and extend underneath and across the same with the free ends 23$^c$ and 23$^d$, respectively, beyond the longitudinal sides of the bar 20, so that they may act as spacing members. These free ends may be turned down to the dotted line position shown in said figure. The welding projections on the bars in this form of the device are marked 21 and 22. Instead of making the bar 23 out of one piece formed with an eye and bent back upon itself, it may be made of two separate pieces, as shown, twisted together with a crotch 24$^b$, at the upper end to receive and to which the bars 25 are welded.

In the construction shown in Fig. 5, wherein the longitudinal shear member is marked 30, and the welding projections are marked 31 and 32, respectively, the transverse members 33 are formed of twisted rods made up of four strands. Two of these strands are separated at the lower end to form the legs 33$^a$ and 33$^b$. These legs are welded to the longitudinal bar 30, at the welding points 31 and 32. The free ends of these double strands are untwisted beyond the welds and separated to form the spacing elements or legs 33$^c$, 33$^d$ and 33$^e$, 33$^f$. The upper ends of these strands are separated to form a crotch 34, to receive the rods 35.

In the construction shown in Fig. 6, the tension member is marked 40, the welding projections 41 and 42, and the transverse members 43. The transverse members 43 are formed of two twisted members 43$^a$ and 43$^b$, each of which is made up of two twisted strands 43$^c$, 43$^d$ and 43$^e$, 43$^f$, respectively. The strands 43$^d$ and 43$^f$ extend below the longitudinal member 40 to form spacing members, and the strands 43$^c$ and 43$^e$ are passed beneath the longitudinal member 40, with the free ends thereof extending beyond the lateral sides also to form spacing members when the frame is placed in the form.

While in several forms the upper members or bars 15, 25 or 35, are shown, it is to be understood that the said rods or bars may be dispensed with in some forms of the construction.

While the shear members have been described as being made up of twisted rods, it is understood that they may be made of a single piece with bifurcated ends to connect to the longitudinal tension members.

Having now described my invention, what I claim as new and desire to secure by Letters Patent is:

1. A reinforcement for concrete construction consisting of a longitudinal member having a series of welding projections thereon, a series of transverse or shear members at each end of the longitudinal member, each of said shear members being formed of rods twisted upon themselves, having separated ends, the sides of each of which are welded to the longitudinal member, the extreme ends projecting beyond the longitudinal member to form centering members, and rods extending over each end of the tension member and rigidly connected to the upper ends of the shear members.

2. A reinforcement for concrete construction consisting of a longitudinal tension member having welding projections on the sides thereof, a series of transverse shear members consisting of a series of rods twisted together, one end of said shear members being bifurcated, each leg of the bifurcation being welded to the longitudinal tension member, and each of said legs being also bifurcated beyond the point of weld and separated to form spacing members.

In witness whereof I have hereunto set my hand at the borough of Manhattan, city and State of New York, this 18th day of October 1912.

JULIAN O. ELLINGER.

In presence of—
 IsABEL R. RICHARDS,
 AGNES C. O'CONNELL.